(12) United States Patent
Weeter et al.

(10) Patent No.: US 9,605,746 B2
(45) Date of Patent: Mar. 28, 2017

(54) AIRFLOW VENT FOR A TRANSMISSION

(71) Applicant: GM Global Technology Operations LLC, Detroit, MI (US)

(72) Inventors: Greg Alan Weeter, Ann Arbor, MI (US); Nilesh Patil, Sangli (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/686,208

(22) Filed: Apr. 14, 2015

(65) Prior Publication Data
US 2016/0305536 A1    Oct. 20, 2016

(51) Int. Cl.
| | |
|---|---|
| *F16H 57/04* | (2010.01) |
| *F16K 24/04* | (2006.01) |
| *F16K 31/00* | (2006.01) |
| *F16K 1/32* | (2006.01) |
| *F16H 57/027* | (2012.01) |

(52) U.S. Cl.
CPC ....... *F16H 57/0416* (2013.01); *F16H 57/027* (2013.01); *F16K 1/32* (2013.01); *F16K 24/04* (2013.01); *F16K 31/002* (2013.01)

(58) Field of Classification Search
CPC ...... F16H 57/027; F16H 57/0416; F16K 1/32; F16K 24/04
See application file for complete search history.

(56) References Cited

U.S. PATENT DOCUMENTS

| | | | | |
|---|---|---|---|---|
| 3,686,973 A | * | 8/1972 | Davison, Jr. | .......... F16H 57/027 74/606 R |
| 6,474,748 B1 | * | 11/2002 | Cunkelman | ........... B60T 13/665 303/15 |

* cited by examiner

*Primary Examiner* — Thomas Diaz

(57) ABSTRACT

A vent for a motor vehicle transmission includes a housing attached to a bell housing of the transmission and a plate mounted in the housing. The housing has an opening, and the plate has an open position to enable heat to dissipate from the interior of the bell hosing through the opening of the housing and a closed position to prevent debris or water from entering through the opening of the housing into the interior of the bell housing.

10 Claims, 4 Drawing Sheets

9,605,746 B2

AIRFLOW VENT FOR A TRANSMISSION

FIELD

The present disclosure relates to motor vehicle transmissions. More specifically, the present disclosure relates to a transmission clutch housing with airflow vents.

BACKGROUND

The statements in this section merely provide background information related to the present disclosure and may or may not constitute prior art.

A typical manual transmission for a motor vehicle includes a housing that contains a clutch and flywheel assembly. Water entering into the housing can remove grease in the clutch and flywheel, thereby increasing NVH issues. And road particulates entering into the housing can increase wear or degrade the clutch hydraulic seals, which may result in leaks. Accordingly, the housing is generally sealed to prevent water and debris, such as road particulates, from entering into the housing. A closed housing, however, can result in raised temperatures within the housing during the operation of the transmission, which may damage certain components within the housing.

Accordingly, there is a need for a transmission clutch housing that prevents debris and water from entering the housing while dissipating heat.

SUMMARY

A vent for a motor vehicle transmission includes a housing attached to a bell housing of the transmission and a plate mounted in the housing. The housing has an opening, and the plate has an open position to enable heat to dissipate from the interior of the bell hosing through the opening of the housing and a closed position to prevent debris or water from entering through the opening of the housing into the interior of the bell housing.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1A:
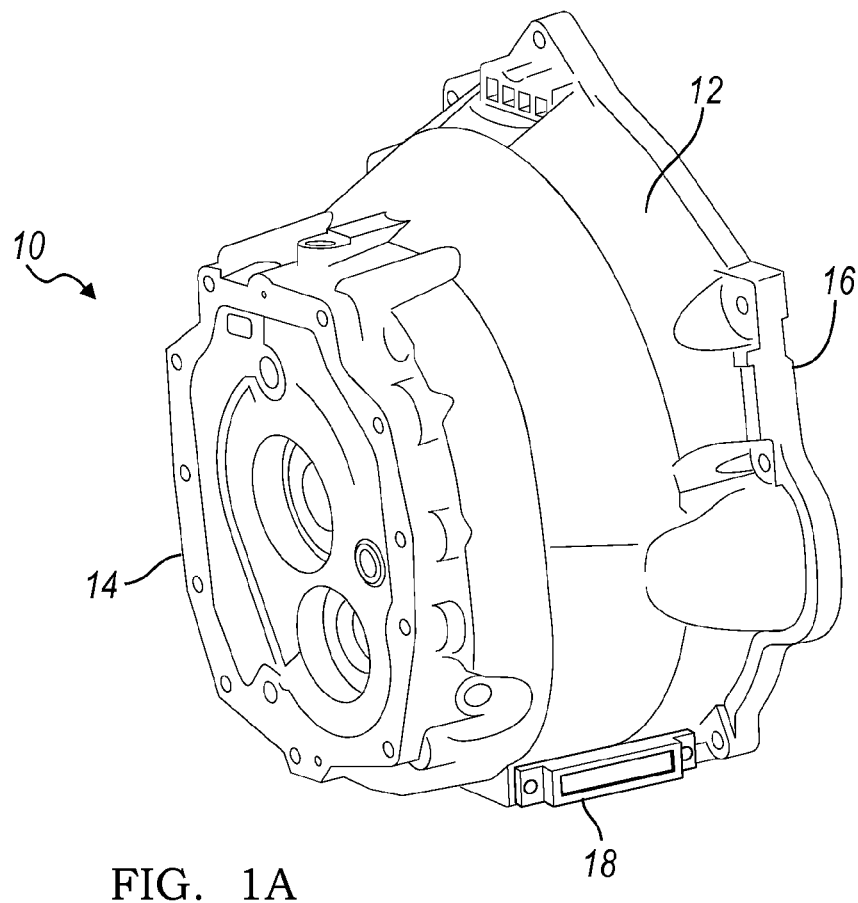
FIG. 1A is a perspective view of a transmission clutch housing with an air vent in accordance with the principles of the present invention.
Figure 1B:
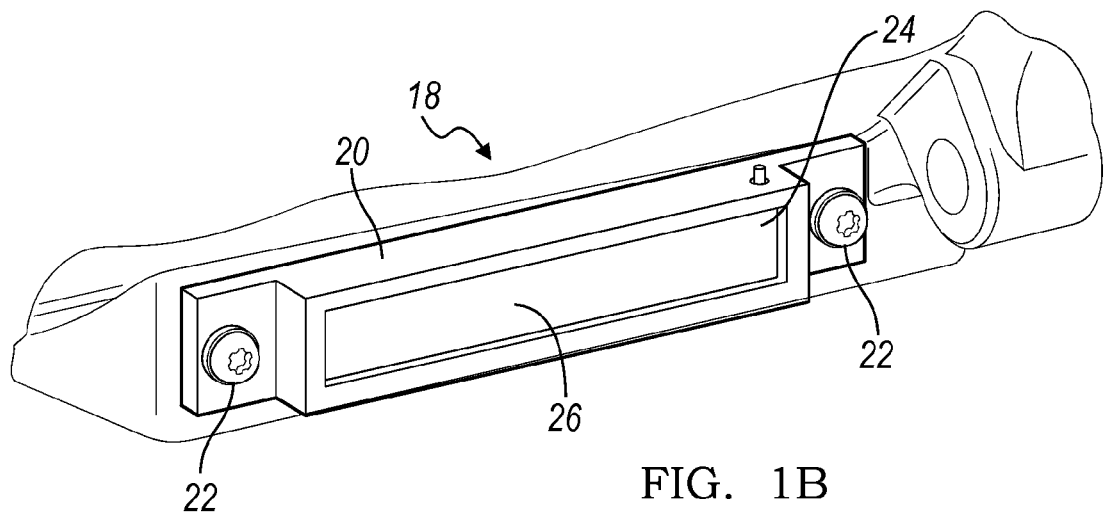
FIG. 1B is a close-up view of the air flow vent.

Referring now to the drawings, a portion of a motor vehicle transmission embodying the principles of the present invention is illustrated in FIGS. 1A and 1B and designated at 10. The transmission portion 10 includes a bell housing 12 in which a clutch and flywheel are located. The bell housing 12 includes one end 14 that connects to the remainder of the transmission and another end 16 that connects to the vehicle's engine. The bell housing 12 further includes a vent 18 that selectively dissipates heat from the bell housing 12 while preventing water and debris, such as road particulates, from entering the bell housing 12.

The vent 18 includes a housing 20 attached to the bell housing 12 with, for example, a set of screws 22. The housing 20 includes an opening 24 and a plate 26 positioned within the opening 24. The plate 26 selectively opens to enable the interior of the bell housing 12 to communicate with the exterior of the bell housing, thereby allowing heat to escape from the bell housing 12. Dissipation of heat from the bell housing 12 reduces clutch wear and temperature related degradation of the components in the bell housing 12. Further, closure of the plate 26 prevents water and debris from entering into the bell housing 12 when, for example, the vehicle drives through a puddle and/or is exposed to heavy rain, since water and debris within the housing could compromise the functionality of the clutch and flywheel within the bell housing 12.

The vent 18 can be a passive vent that opens up when a predetermined temperature threshold in the interior of bell housing 12 is reached. The vent 18 remains open unless the interior bell housing temperature decreases below the temperature threshold. Alternatively, the vent 18 can be an actively controlled vent that opens and closes based on calibration variables. These variables can include, for example, the housing temperature, the vehicle speed and/or the ambient humidity, as well as any other suitable variable. Hence, for example, when the interior bell housing temperature reaches the temperature threshold, an actuator can be employed to open the vent 18 and keep it open to dissipate heat from the interior of the bell housing. And when the vehicle reaches and exceeds a particular speed and/or when the ambient humidity exceeds a threshold humidity, the actuator closes the vent 18 to prevent debris and/or water from entering the bell housing 12.

Figure 2A:
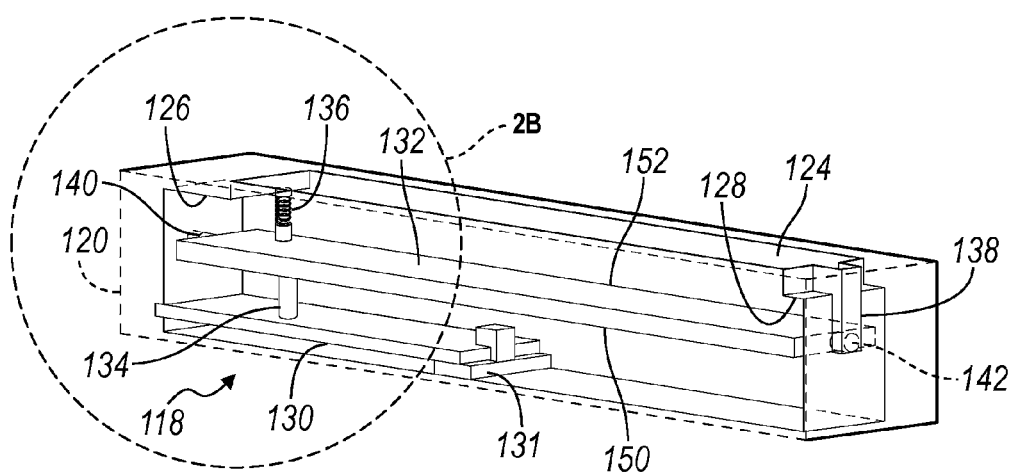
FIG. 2A is perspective view of a passive air flow vent in accordance with the principles of the present invention.
Figure 2B:
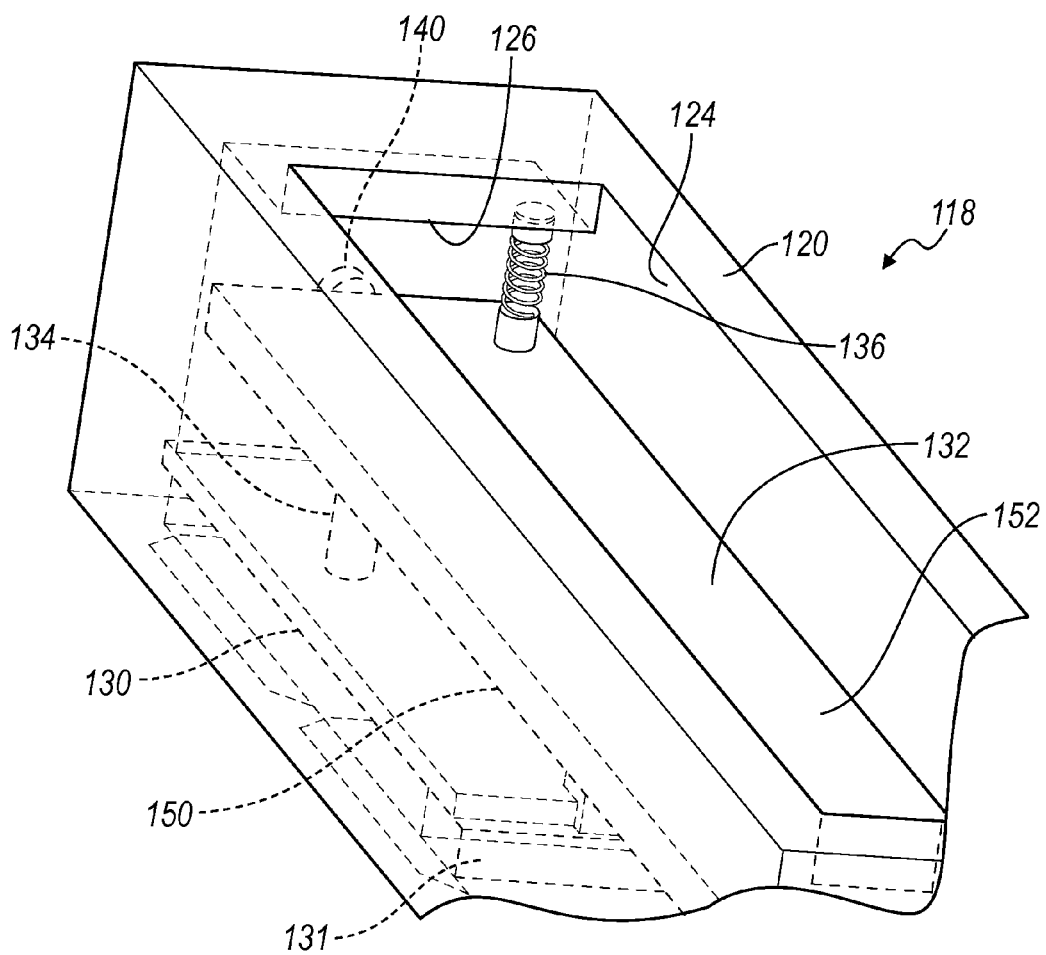
FIG. 2B is a close-up view of the region 2B in FIG. 2A.

Referring now to FIGS. 2A and 2B, there is shown a particular form of a passive vent 118 that can be mounted to the previously described bell housing 12. The vent 118 includes a housing 120 with an opening 124 and a plate 132 mounted in the interior of the housing 120. Specifically, the plate 152 is attached to the interior of the housing 120 at pivots 140 and 142 located at opposite ends of the plate 152, which enables the plate 152 to rotate about the pivots 140 and 142.

Positioned below the plate 132 is a secondary plate 130 that is also mounted within the interior of the housing 120 with a fixture 131. A stop 134 is attached to the secondary plate 130 and is positioned between the secondary plate 130 and a bottom surface 150 of the plate 132. A biasing mechanism, such as a spring 136, is positioned between an upper surface 152 of the plate 132 and an interior surface 126 of the housing 120.

As arranged, the spring 136 provides a biasing force that rotates the plate 132 about the pivots 140 and 142 such that the portion of the bottom surface 150 initially in contact with the stop 134 moves away from the stop 134. The plate 132 is able to rotate until an edge of the upper surface 152 abuts against the interior surfaces 126 and 128 of the housing 120. When the plate 132 is rotated to this open position, the opening 124 allows the interior of the bell housing to communicate with the exterior of the bell housing 12 such that heat can dissipate from the interior of the bell housing.

In particular arrangements, the spring 136 is a bimetallic spring that is attached to both the inner surface 126 of the housing 120 and the upper surface 152 of the plate 132. In such an arrangement, the spring 136 expands when the interior bell housing temperature reaches a predetermined temperature threshold, thereby causing the plate 132 to rotate to the open position as described previously. When the interior bell housing temperature falls below the temperature threshold, the spring 136 contracts and pulls on the upper surface 152 of the plate 132, thereby causing the plate 132 to rotate back to a closed position in which the bottom surface 150 of the plate 132 is in contact with the stop 134. When the plate 132 is in the closed position, the interior of bell housing 12 is closed off from the exterior environment.

Figure 3A:
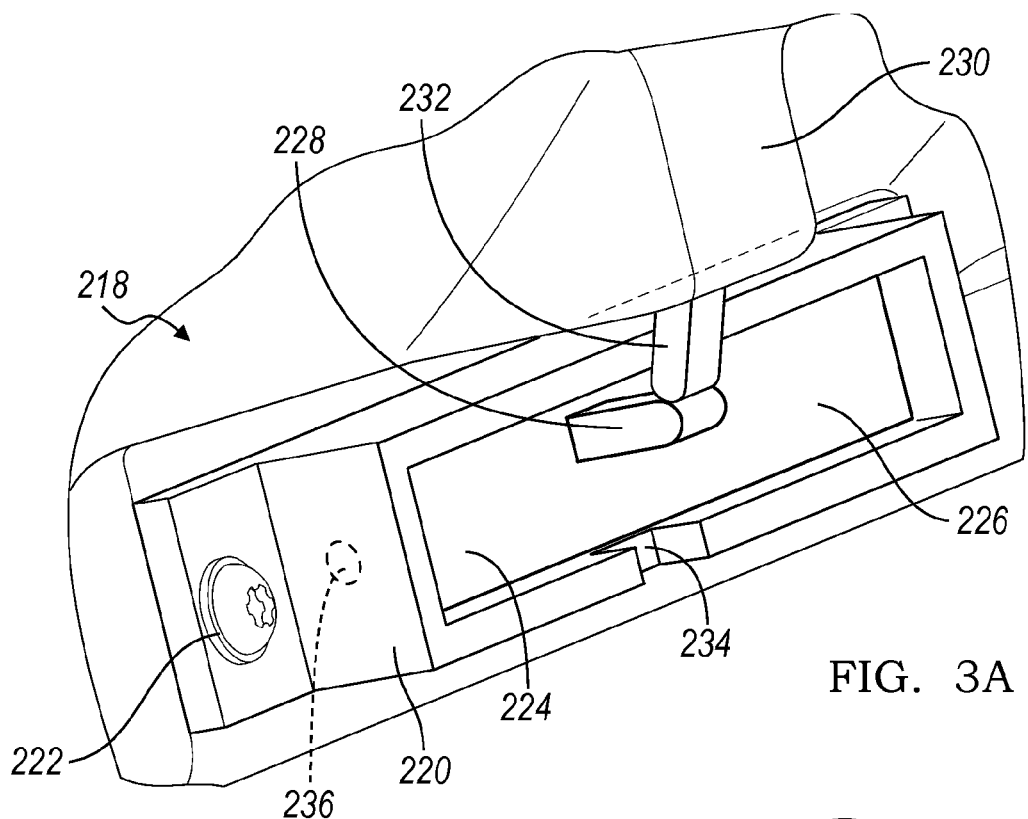
FIG. 3A is a perspective view of an active air flow vent in a closed condition in accordance with the principles of the present invention.
Figure 3B:
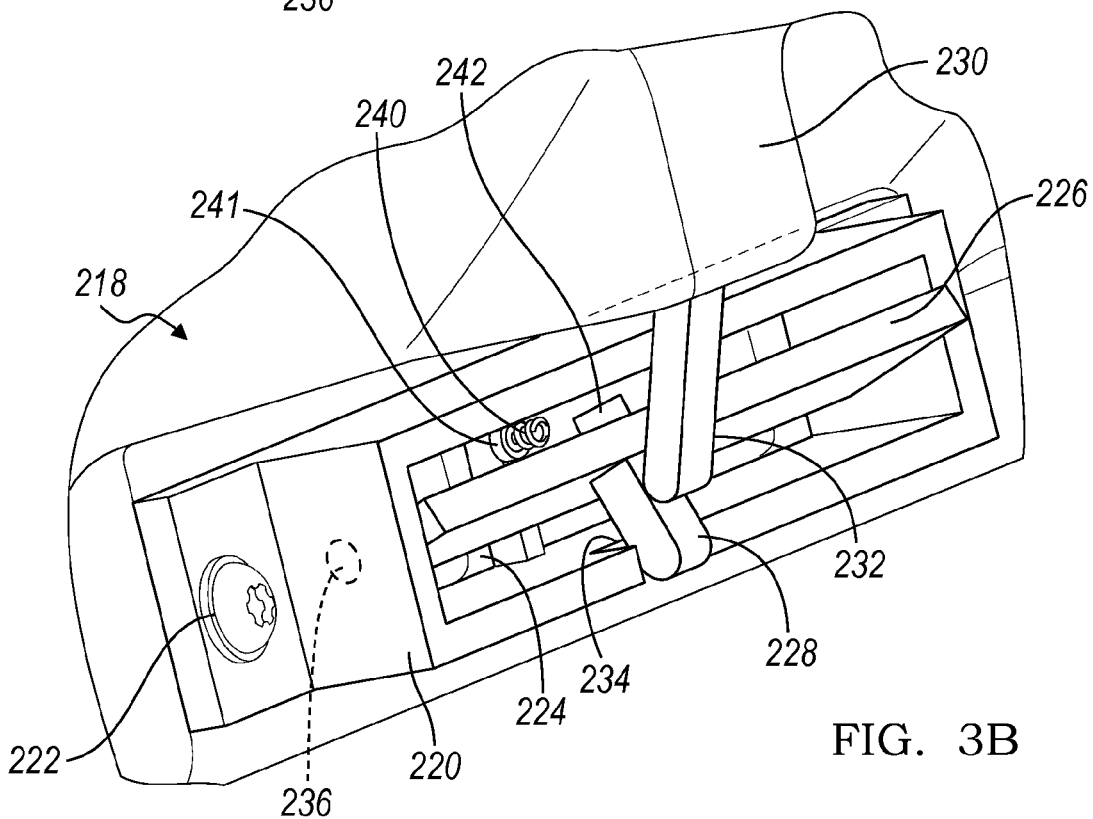
FIG. 3B is a perspective view of the air flow vent shown in FIG. 3A in an open condition.

Turning now to FIGS. 3A and 3B, there is shown an actively controlled vent 218. The vent 218 includes a housing 220 mounted to the aforementioned bell housing 12 with a set of attachment mechanisms such as a set of screws 222. The vent 218 includes a plate 226 that is pivotally mounted in the housing 220 at pivots 236 located on each side of the plate 226.

The vent 218 further includes an actuator 230 with a projection 232 that engages with a projection 228 attached to the plate 226. Hence, when a particular calibration variable is reached such as the interior bell housing temperature, the actuator 230 extends the projection 232 to push down on the projection 228, which causes the plate 226 to rotate about the pivots 236. The plate 226 is able to rotate until the projection 228 engages and sits within a notch 234 of the housing 220. The rotation of the plate 226 provides an opening 224 that allows the interior of the bell housing 12 to communicate with the exterior of the bell housing so that heat can dissipate from the interior of the bell housing 12. When another calibration variable, such as, for example, the vehicle speed and/or ambient humidity, the actuator 230 withdraws the projection 232 away from the projection 228 such that the plate 226 rotates about the pivots 236 to close off the opening 224, which prevents debris and water from entering the interior of the bell housing 12. The vent 218 may include a spring 240 mounted in the interior of the housing 220 that selectively abuts against a stop 242 attached to the plate 226 to ensure that the plate rotates to a desired closed position.

Figure 4:
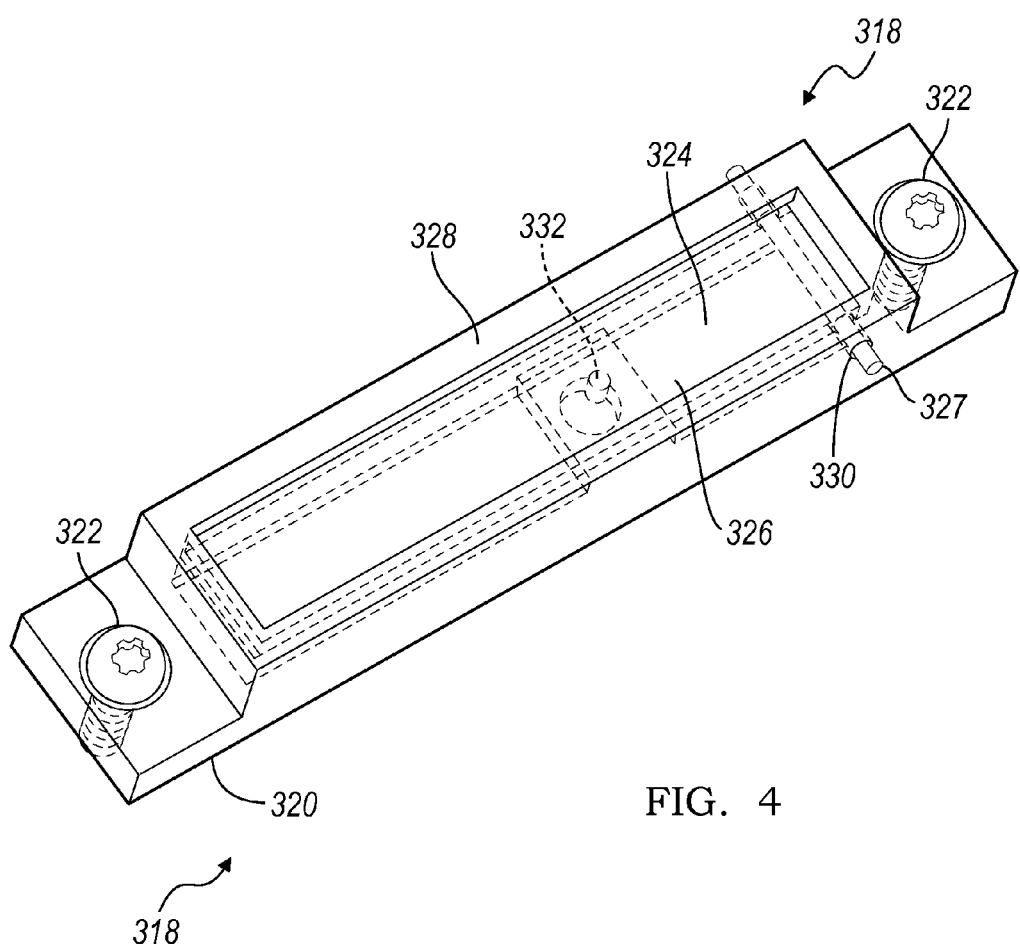
FIG. 4 is a perspective view of another active air flow vent in accordance with the principles of the present invention.

Referring now to FIG. 4, there is shown yet another actively controlled vent 318. The vent 318 includes a housing 320 mounted to the bell housing 12 with, for example, a set of screws 322. The vent 318 also includes a plate 326 mounted to the housing 320 with a hinge 327 at a pivot 330 such that the plate 326 is able to rotate about the pivot 330 to selectively provide an opening 324. The vent 318 further includes an actuator mounted within the housing 320 and positioned on the underside of the plate 326. The actuator 332 acts as a push/pull actuator. Hence, when the actuator 322 pushes against the plate 326, the plate 326 rotates about the pivot 330 to a closed position to close off the opening 324 to prevent debris and water from entering into the bell housing. And when the actuator 332 pulls on the plate 326, the plate 326 rotates about the pivot 330 to an open position to open up the opening 324 to the interior of the bell housing 12 to allow heat to dissipate from the interior of the bell housing. The actuator 332 can be a thermal actuator that activates and moves the plate 326 to an open position when a threshold bell housing temperature is reached, or, additionally or alternatively, the actuator 332 activates and moves the plate to a closed position when the vehicle speed and/or ambient humidity exceeds predetermined threshold values.

In any of the aforementioned vent arrangements, the threshold humidity can be determined and calibrated, for example, to predict when the vehicle is driving through or exposed to water. Further, as mentioned previously, the vehicle speed can be a calibration variable that determines when the vents close or open. Moreover, the engine speed can be a calibration variable as well. Hence, in any of the vent arrangements discussed above, the vents may close when the vehicle is driving at a low speed yet may open when the engine speed reaches predetermined engine speed threshold, since heat generation and heat transfer increases with engine speed, in particular, the convective heat transfer from the inside to the outside of the bell housing.

The description of the invention is merely exemplary in nature and variations that do not depart from the gist of the invention are intended to be within the scope of the invention. Such variations are not to be regarded as a departure from the spirit and scope of the invention.

What is claimed is:

1. A vent for a motor vehicle transmission comprising:
a housing attached to a bell housing of the transmission, the housing having an opening; and
a plate mounted in the housing, the plate having an open position to enable heat to dissipate from the interior of the bell housing through the opening of the housing and a closed position to prevent debris or water from entering through the opening of the housing into the interior of the bell housing,
wherein the vent is an active vent with an actuator that moves the plate to the open and closed positions, the actuator including a first projection that engages with a second projection attached to the plate, the actuator extending the first projection when an interior temperature of the bell housing reaches a predetermined temperature threshold so that the first projection pushes against the second projection which causes the plate to move to the open position.

2. The vent of claim 1 wherein the actuator is a thermal actuator that moves the plate to the open position when an interior temperature of the bell housing reaches a predetermined temperature threshold and moves the plate to the closed position when the interior temperature of the bell housing falls below the predetermined temperature threshold.

3. The vent of claim 1 wherein the actuator moves the plate to the closed position when the speed of the vehicle reaches a predetermined speed threshold.

4. The vent of claim 1 wherein the actuator moves the plate to the closed position when the ambient humidity reaches a predetermined humidity threshold.

5. The vent of claim 1 wherein the actuator withdraws the first projection when the interior temperature of the bell housing falls below the predetermined temperature threshold so that the first projection pulls from the second projection which causes the plate to move to the closed position.

6. The vent of claim 1 wherein the actuator moves the plate to the open and closed positions based on one or more calibration variables.

7. The vent of claim 6 wherein the calibration variable is a temperature threshold of the interior of the bell housing.

8. The vent of claim 6 wherein the calibration variable is a speed threshold of the motor vehicle.

9. The vent of claim 6 wherein the calibration variable is an ambient humidity.

10. A bell housing a motor vehicle transmission comprising:
- a vent including:
    - a housing attached to the bell housing of the transmission, the housing having an opening; and
    - a plate mounted in the housing, the plate having an open position to enable heat to dissipate from the interior of the bell housing through the opening of the housing and a closed position to prevent debris or water from entering through the opening of the housing into the interior of the bell housing,
- wherein the vent is an active vent with an actuator that moves the plate to the open and closed positions, the actuator including a first projection that engages with a second projection attached to the plate, the actuator extending the first projection when an interior temperature of the bell housing reaches a predetermined temperature threshold so that the first projection pushes against the second projection which causes the plate to move to the open position.

* * * * *